June 24, 1930.  D. M. SOLENBERGER  1,767,819
PISTON RING INSTALLING DEVICE
Filed July 11, 1927   2 Sheets-Sheet 1
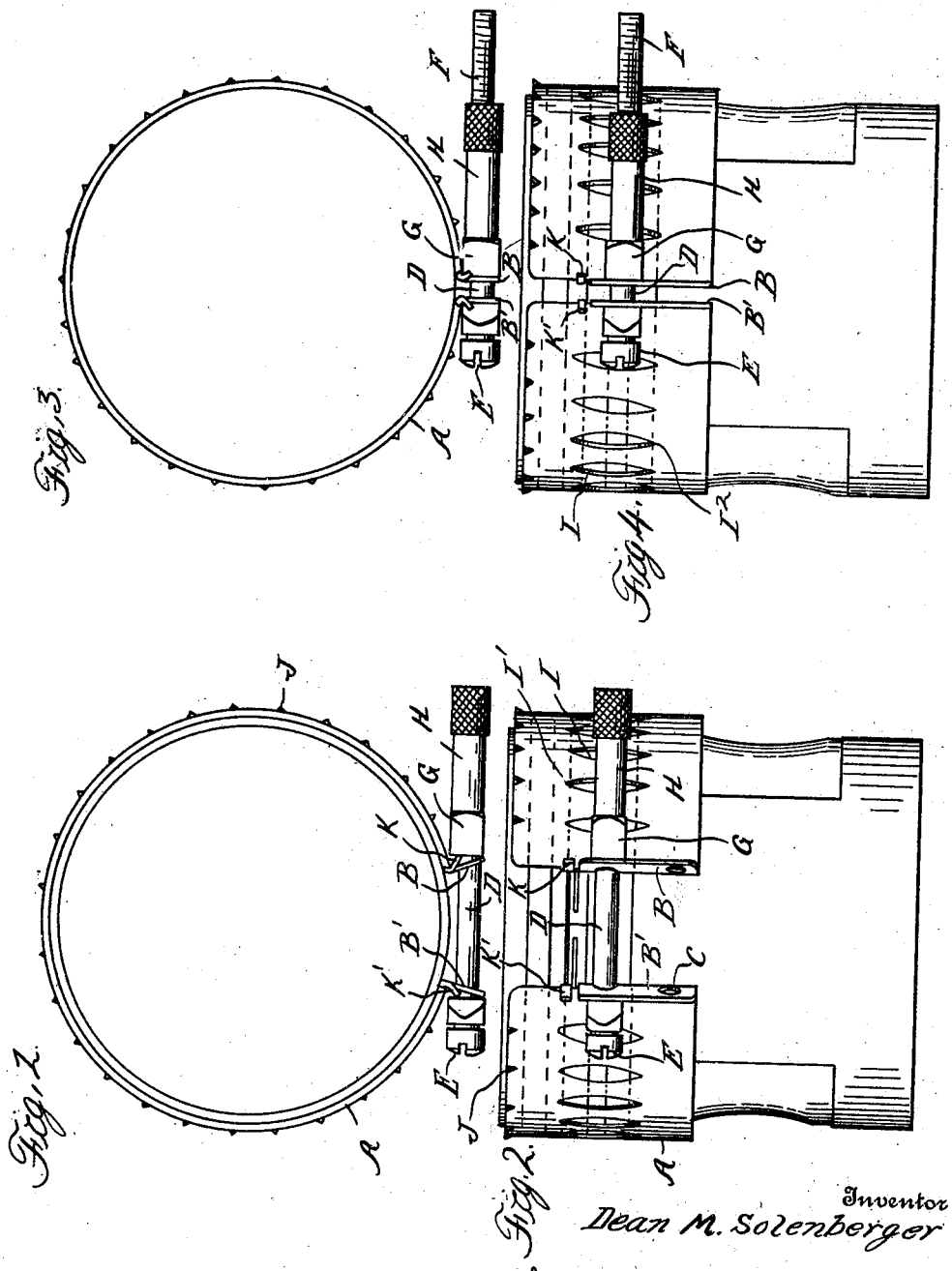
Inventor
Dean M. Solenberger June 24, 1930.  D. M. SOLENBERGER  1,767,819
PISTON RING INSTALLING DEVICE
Filed July 11, 1927   2 Sheets-Sheet 2
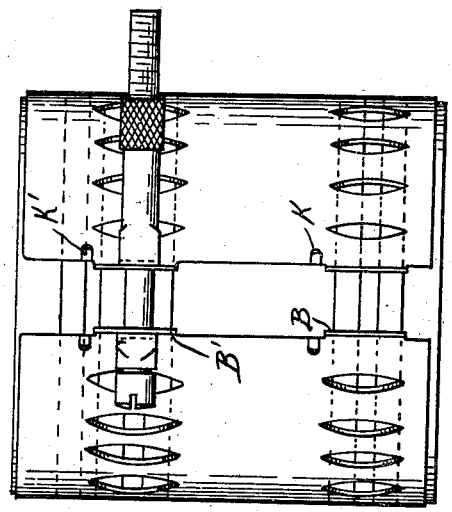
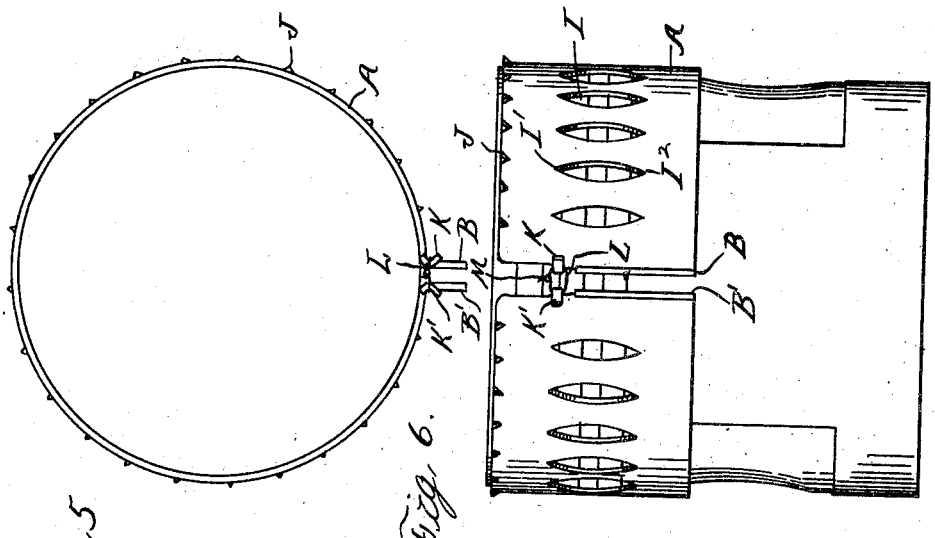
Inventor
Dean M. Solenberger Patented June 24, 1930

1,767,819

UNITED STATES PATENT OFFICE

DEAN M. SOLENBERGER, OF CLEVELAND, OHIO, ASSIGNOR TO THE SIMPLEX PISTON RING CO. OF AMERICA INCORPORATED, OF CLEVELAND, OHIO, A CORPORATION OF OHIO

PISTON-RING INSTALLING DEVICE

Application filed July 11, 1927. Serial No. 204,952.

The invention relates to devices for facilitating the installation of radially resilient rings into the grooves of pistons.

In the present state of the art considerable difficulty is experienced in installing rings particularly where the construction of motor is such that the piston must be introduced through the crank case end of the cylinders. In many instances the clearances provided are so small as to cause interference with the ring clamp and therefore prevent its successful use. Another difficulty is to contract the ring into the groove without danger of breakage due to some part catching upon the side wall of the groove. To overcome these and other difficulties which have been encountered I have devised a construction of clamp in which there will be no interference with other parts during the operation of installing the rings. I have further obtained a construction which enables the operator to inspect the rings as they are being radially contracted into the grooves and thus to avoid breakage through incomplete registration. The invention therefore consists in the construction by which these and other advantages are obtained as hereinafter set forth.

In the drawings:

Figure 1 is a plan view of the clamp as first applied to a ring or rings which are to be contracted into the piston grooves.

Figure 2 is a side elevation thereof.

Figures 3 and 4 are views respectively similar to Figures 1 and 2 showing the clamp after contraction of the ring.

Figures 5 and 6 are similar views after removal of the contracting means from the clamp.

Figure 7 is a side elevation of a portion of a modified construction.

My improvement consists essentially in the thin metal sleeve for surrounding the rings and piston together with detachable means engageable with said sleeve for variably contracting the same and means for holding the sleeve thus contracted after removal of the contracting means. Thus, as shown A is the sheet metal split sleeve which is of sufficient axial length to cover all of the ring grooves in the piston and of a circumferential length to extend around the greater portion of the circle of the piston. The ends of the sleeve at opposite sides of the split are provided with oppositely extending ears or flanges B and B' and are perforated at one or more points at C to receive the shank of a clamping screw D. This screw is preferably provided at one end with a slotted head E for the engagement of a screwdriver and at opposite ends is threaded at F to engage a clamping nut G. This nut is preferably integral with a sleeve H of sufficient length to hold the same in axial coincidence with the shank F, the inner end of said sleeve being adapted to bear against the flange or ear B. There is also preferably a second sleeve arranged between the head E and the flange B' and having a swivel engagement with the shank. These sleeves may be held from turning by forming their inner ends of square or polygonal shape and thus by use of a screw driver the sheet metal sleeve may be radially contracted or expanded.

Where circumferentially slotted axially expansible rings are to be engaged with the ring grooves it is necessary to compress the same so that they will enter the grooves. Should a portion of the ring not be fully entered and clamping pressure applied to the sleeve there would be danger of breaking the ring. Therefore it is desirable to have means permitting both of inspection and adjustment of the rings while they are being contracted. This I preferably accomplish by a series of apertures extending circumferentially around the sleeve being separated from each other by uncut portions but providing access to the rings at spaced points. These perforations preferably extend to a width equal to the combined width of all of the adjacent grooves in the piston but it is important not to weaken the sleeve. Another thing to be avoided is any edge which if indented might catch upon the ring and cause breakage. I have accomplished the desired results by cutting away the sleeve to form a series of apertures I elongated to the full width of the ring grooves and tapering from a maximum width at the center to points or apices I', I² at opposite ends. This not only gives a clear view of the rings and the grooves but also avoids the forming of any edge of even approximated parallelism to the edges of the rings which, if indented, might catch upon said rings. On the other hand any indentation in the edge of the tapering apertures will form a curve or cam surface which will ride over the ring without catching thereon.

Where a piston loosely fits the cylinder there might be sufficient clearance to permit the contracted sleeve to enter the cylinder. I have guarded against this result by forming a series of outwardly extending indentations in the upper edge of the sleeve A as indicated at J. These will have the effect of increasing the thickness of the sleeve in excess of any clearance between the piston and cylinder.

As has been stated, it frequently happens that the means for contracting the sleeve will interfere with some other part of the engine during the insertion of the piston in the cylinder. I have therefore provided means independent of the contracting device for holding the sleeve contracted. This means may comprise any suitable anchoring device but as shown consists of a pair of small hooks K, K' at the ends of the sleeve on opposite sides of the split which are adapted to be engaged by a connecting link preferably a loop of wire. The hooks, K, K' are preferably arranged near the center of the sleeve or where the sleeve is of considerable length a plurality of pairs of hooks may be arranged at different points in the length thereof. After the rings have been contracted into the grooves through the operation of the contracting means previously described a wire loop L may be engaged with the hooks and the ends twisted together as at M to retain the sleeve from expansion. The contracting means may then be removed which will permit of inserting the piston in the cylinder without interference.

The modified construction shown in Figure 7 is designed for use with pistons having ring grooves at opposite ends thereof. This necessitates a relatively long sleeve and the provision of inspection apertures in the opposite end portions thereof. Each end portion is provided with apertured flanges B, B' and hooks K, K' so that the rings at the opposite ends of the piston may be separately contracted and locked.

What I claim as my invention is:

1. A device for installing rings in grooved pistons comprising a flexible split sleeve for surrounding the rings and piston, removable means engaging said sleeve for contracting the same, and means independent of said contracting means for retaining the sleeve in contracted position after removal of the contracting means therefrom.

2. A device for installing rings in grooved pistons comprising a flexible split sleeve, said sleeve having flanges projecting therefrom on opposite sides of the split means for variably contracting said sleeve, and means independent of said contracting means for retaining the sleeve in any position to which it may be contracted.

3. A device for installing rings in grooved pistons comprising a flexible split sleeve for surrounding the rings and piston, means for contracting said sleeve, and there being hooks at the ends of said sleeve on opposite sides of the split adapted to receive a twisted wire loop for retaining the sleeve contracted.

4. A device for installing rings in grooved pistons comprising a flexible split sleeve for surrounding the rings and piston, said sleeve having flanges projecting therefrom on opposite sides of the split, means detachably engaging said flanges for contracting said sleeve, and there being hooks on opposite sides of the split for engaging a loop to retain said sleeve contracted after removal of the contracting means therefrom.

5. A device for installing rings in grooved pistons comprising a flexible split sleeve for surrounding the rings and piston, means for contracting said sleeve, there being hooks at the end of said sleeve on opposite sides of the split, and a ring for engaging said hooks to retain the sleeve contracted.

6. A device for installing rings in grooved pistons comprising a flexible one-piece split sleeve for surrounding the rings and piston, and contracting means therefor, said sleeve being provided with a circumferential series of apertures therein for access to and inspection of said rings while being contracted.

7. A device for installing rings in grooved pistons comprising a flexible one-piece split sleeve for surrounding the rings and piston, and contracting means therefor, said sleeve being provided with a circumferential series of axially elongated apertures therein for access to and inspection of the rings during contraction thereof.

8. A device for installing rings in grooved pistons comprising a flexible one-piece split sleeve for surrounding the rings and piston, and contracting means therefor, said sleeve being provided with a circumferential series of apertures therein for inspecting the rings and grooves, the edges of said apertures being out of parallelism to the edges of the ring.

9. A device for installing rings in grooves of pistons comprising a flexible one-piece split sleeve for surrounding the rings and piston, and contracting means therefor, said sleeve being provided with a circumferential series of apertures therein for inspecting the rings and grooves, said apertures tapering longitudinally upon the sleeve from a maximum width at the center to apices at opposite ends thereof.

10. In a device for installing piston rings, a split sleeve adapted to embrace a piston ring, means for contracting the sleeve and the ring embraced thereby, said sleeve being provided with anchoring devices, and a fastener adapted to engage said anchoring devices to hold the sleeve in contracted position independently of said contracting means.

11. In a device for installing piston rings, a split sleeve adapted to embrace a piston ring, means for contracting the sleeve and the ring embraced thereby, said sleeve being provided with anchoring devices, and means adapted to engage said anchoring devices to hold the sleeve in contracted position independently of said contracting means.

12. A device for installing rings in grooved pistons comprising a flexible split sleeve for surrounding the rings and piston, removabe means engageable with the exterior of said sleeve for contracting the same, and means independent of said contracting means for retaining the sleeve in contracted position after removal of the contracting means therefrom.

In testimony whereof I affix my signature.

DEAN M. SOLENBERGER.